United States Patent Office 3,585,058
Patented June 15, 1971

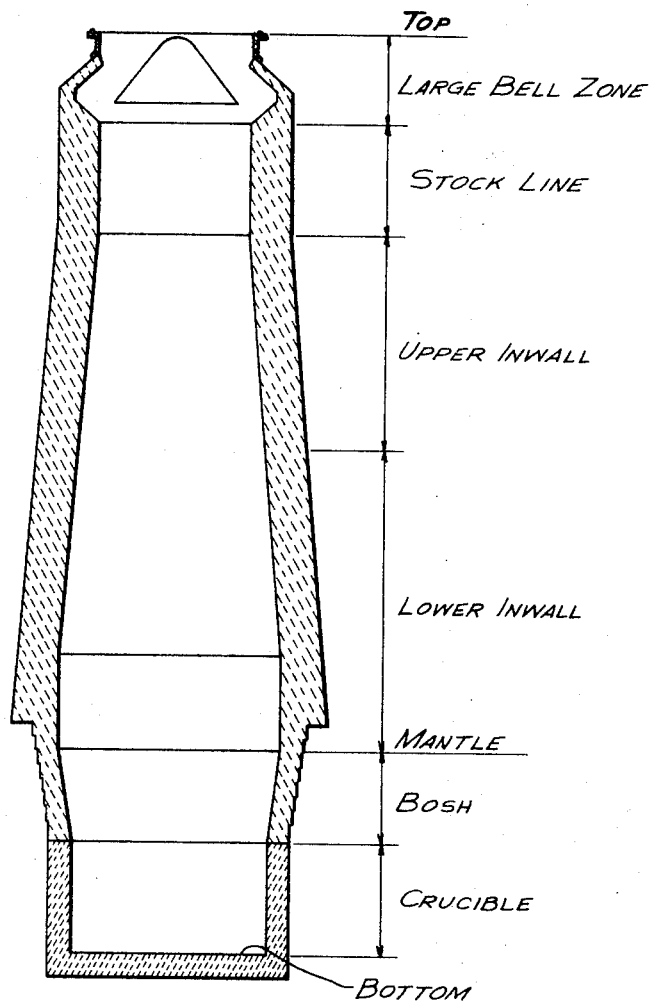

3,585,058
ALUMINA-CHROME REFRACTORIES
Daniel E. Reardon, Bethel Park, Pa., assignor to Dresser Industries, Inc., Dallas, Tex.
Filed June 3, 1968, Ser. No. 733,848
Int. Cl. C04b 35/10, 35/12
U.S. Cl. 106—66    3 Claims

ABSTRACT OF THE DISCLOSURE

Sintered refractory comprising from 25 to 60%, by weight, $Cr_2O_3$, ½ to 10% $TiO_2$, the remainder $Al_2O_3$ and less than 1% associated impurities.

BACKGROUND

Since the advent of the carbon lined hearth and hearth side walls in blast furnaces, it is not uncommon for the furnace to run two normal campaigns on one carbon hearth. This improvement in the construction of the furnace has left the bosh and lower side wall area as the most vulnerable in the furnace. The bosh and lower side wall linings are continually washed by slags that are reactive with both acid and basic refractories. Slag attack is believed to be the primary mechanism of failure in this area of the lining. The up-grading of the conventional fireclay high alumina refractories used in these areas has failed to provide sufficiently uniformly wearing linings to take full economic advantage of carbon hearths. Hence, ironmakers are turning to entirely new concepts in blast furnace lining. Exotic refractory such as those formed by fusion casting are being installed in the bosh and lower side wall area. Unfortunately, fused cast refractories are very expensive due to the large amount of electrical energy required for their manufacture. The basis for selecting fused cast refractories was their well known superiority to other types of refractories in slag resistance.

It is an object of this invention to provide a refractory formed by a more conventional method which can be used in the blast furnace bosh and lower side wall (inwall) areas. It is a further object to provide a blast furnace lining which wears in a more uniform manner. It is still yet another object to provide a refractory composition that is unfused but has resistance to slag erosion characteristic of fused refractories.

BRIEF DESCRIPTION OF THE INVENTION

According to this invention, a sintered refractory shape is provided comprising from 25 to 60%, by weight, $Cr_2O_3$, ½ to 10%, by weight, $TiO_2$, the remainder $Al_2O_3$ and less than 1% alkali or alkaline earth oxide impurities. Up to about 5% silica or iron oxide are acceptable as impurities. Preferably, all impurities are less than 1%. Such shape is microscopically characterized by connected grains of $Al_2O_3 \cdot Cr_2O_3$ solid solution and isolated pockets of aluminum titanate. The grains of solid solution have an average diameter greater than 50 microns. Preferred refractories, according to this invention, comprise 40 to 50% $Cr_2O_3$ and 1 to 5% $TiO_2$. Brick according to the teachings of this invention have outstanding resistance to blast furnace-type slags.

Blast furnaces are tall, narrow shaft-like structures. They are charged with the ironmaking raw materials at the top. Iron and slags are drawn off from the lower part of the furnace. The hottest portion of the blast furnace is near the bottom. The blast furnace is lined with refractory brick. The bosh and lower inwall (side wall) are water-cooled. According to the teachings of this invention, a blast furnace lining is comprised of a crucible bottom lined with carbon brick and a bosh and a portion of lower inwall lined with a sintered refractory shape comprising 25 to 60%, by weight, $Cr_2O_3$, ½ to 10% $TiO_2$, the remainder $Al_2O_3$ and less than 1% alkali or alkaline earth oxide impurities. The remainder of the lining is comprised of conventional fireclay and high alumina shapes.

THE DRAWING

The drawing is a schematic of a section of a blast furnace.

DETAILED DESCRIPTION

Further features and other objects and advantages of this invention will become clear to those skilled in the art by a careful study of the description. In this specification and appended claims, all percentages and ratios and parts are by weight; chemical analyses were obtained by spectrographic analysis with control by wet chemical analysis, and are reported as oxides in accordance with the present practice in the refractories industry.

Brick according to the teachings of this invention must be fabricated from very finely divided batches. Finely divided is meant substantially all passing 325 mesh. Such batches can be fabricated into shapes in several ways, for example, by isostatic pressing or by slip casting. When shapes according to this invention are to be made by isostatic pressing, the raw batches are prepared by wet ball milling the batch ingredients to obtain a satisfactory degree of fineness. A waxy binder, such as polyethylene glycol and/or polyvinyl alcohol is added to the mixture at least 15 minutes before the milling is terminated. After milling, the resulting slurry is spray dried to form finely divided free flowing powder. The powder is pressed into shape at about 10,000 p.s.i. isostatically.

Exemplary shapes A, B, C and D were prepared in the manner described above. They were burned at 3300° F. Thereafter they were tested for bulk density, theoretical density, examined for grain size and tested for the resistance to erosion by blast furnace slags in a dynamic slag test. The batches used in preparing these shapes and results of testing are included in Table I.

TABLE I

| Example | A | B | C | D |
|---|---|---|---|---|
| Batch (percent): | | | | |
| Alumina | 59 | 39 | 55 | 35 |
| Chromic oxide | 40 | 60 | 40 | 60 |
| Titania | 1 | 1 | 5 | 5 |
| Bulk density, p.c.f. | 250 | 234 | 244 | 242 |
| Percentage of theoretical density | 93 | 83 | 92 | 86 |
| Average grain size, microns | 113 | 68 | 230 | 171 |
| Erosion in dynamic slag test, cc | Trace | 11 | 3 | Trace |

The dynamic slag test comprises placing a sample in a furnace at an angle of approximately 30° to the horizontal. Slag is introduced into the furnace through a water-cooled orifice. As the slag enters the furnace it melts and drips across the surface of the sample being tested. In this test, the temperature of the furnace was 2850° F. 600 grams of slag having the following typical analysis was dripped over the sample.

Slag analysis

|   | Percent |
|---|---|
| Silica ($SiO_2$) | 37 |
| Alumina ($Al_2O_3$) | 9 |
| Titania ($TiO_2$) | 0.7 |
| Iron Oxide ($Fe_2O_3$) | 0.7 |
| Lime (CaO) | 40 |
| Magnesia (MgO) | 8.8 |
| Sulfur Oxide ($SO_3$) | 2.8 |
| Alkalies | 1 |

This slag is considered neutral to slightly basic because the mols of MgO+CaO slightly exceed the mols of $SiO_2$.

Exemplary shapes A, B, C and D are all according to the teachings of this invention. The slag resistance of these compositions is superior to that of fused cast compositions of alpha alumina or beta alumina which, prior to this invention, were considered to be among the most slag resistant refractories available. This fused cast alpha alumina showed 27 cc. erosion, and the fused cast beta alumina 37 cc. erosion in the same dynamic slag test.

It is essential, according to this invention, that the chromic oxide content of the refractories shapes be at least 25%. The exemplary mixes E, F, G, H were prepared in a manner substantially identical to Examples A, B, C and D. They did not, however, have sufficient $Cr_2O_3$. The batches for these comparative mixes and their test results are given in Table II.

TABLE II

| Example | E | F | G | H |
|---|---|---|---|---|
| Batch(percent): | | | | |
| Alumina | 99 | 89 | 79 | 75 |
| Chromic oxide | | 10 | 20 | 20 |
| Titania | 1 | 1 | 1 | 5 |
| Bulk density, p.c.f. | 230 | 237 | 245 | 240 |
| Percentage of theoretical density | 98 | 95 | 83 | 94 |
| Erosion in dynamic slag test, cc | ¹ 30 | ¹ 30 | ² 24 | ² 15 |

¹ Burned 2,900° F.
² Burned 3,300° F.

Table II establishes that chromic oxide content above about 25% is essential according to this invention.

Another feature of this invention is that a small but effective amount of titania must be added to the compositon in order that good slag resistance be achieved. The presence of titania is essential notwithstanding the amount of chromic oxide present in the shapes. Examples I through M were prepared in the same manner as Examples A through D. These examples contained various chromic oxide contents but no titania addition. The batches and test results for these examples are given in Table III.

TABLE III

| Example | I | J | K | L | M |
|---|---|---|---|---|---|
| Batch (percent): | | | | | |
| Alumina | 100 | 90 | 80 | 60 | 40 |
| Chromic oxide | | 10 | 20 | 40 | 60 |
| Bulk density, p.c.f. | 232 | 239 | 237 | 217 | 200 |
| Percentage of theoretical density | 94.5 | 96 | 87.5 | 78.2 | 70.5 |
| Erosion in dynamic slag tests, cc | 34 | 38 | 22 | 24 | 25 |

Table III establishes that the presence of titania in the brick of this invention is essential.

Applicant has found that satisfactory shapes having more than 60% chromic oxide cannot be fabricated from a finely divided or powdered batch by conventional sintering processes. It would be necessary to add alkaline earth oxides or the like which detrimentally affect the slag resistance of the composition.

While applicant has shown that shapes according to the teachings of this invention can be fabricated by isostatic pressing, they can also be fabricated by slip casting. Slip casting techniques for powdered batches are well known in the ceramics art.

While applicant's invention is particularly useful in the lining of blast furnace bosh and lower inwalls, it is suitable for lining any furnace in which corrosion by a neutral slag is a mechanism of wear. By neutral slag, it is meant that the ratio of the mols of lime plus magnesia to the mols of silica is between 1.5:1 and 1:1.5.

The average grain size of the alumina:chrome solid solution grain present in the microstructure of shapes according to this invention must be in excess of about 50 microns. Hence, it is not suitable according to this invention, nor for that matter commercially practical to shape brick by hot pressing. Hot pressing techniques typically result in compositions having an average grain size less than 10 microns. Average grain size was measured according to the technique taught in the article by R. L. Fullman in the Transactions of the AIME, 197 pp. 447 (1953).

Having thus described the invention in detail, and with sufficient particularity as to enable those skilled in the art to practice it, what is desired to have protected by Letters Patent is set forth in the appended claims.

I claim:
1. A sintered refractory shape comprising from 25 to 60%, by weight, $Cr_2O_3$, ½ to 10% $TiO_2$, the remainder $Al_2O_3$ and less than 1% alkali and alkaline earth oxide impurities and up to 5% $SiO_2$ and up to 5% $Fe_2O_3$, said shape microscopically characterized by connected grains of $Al_2O_3 \cdot Cr_2O_3$ solid solution and isolated pockets of aluminum titanate, said grains having an average diameter greater than 50 microns.

2. A sintered refractory according to claim 1 comprising from 40 to 50% $Cr_2O_3$ and 1 to 5% $TiO_2$.

3. A sintered refractory according to claim 1 comprising less than 1% impurities.

References Cited
UNITED STATES PATENTS
3,080,135  3/1963  Steijn _____ 106—66
3,378,385  4/1968  McCreight et al. _____ 106—66

JAMES E. POER, Primary Examiner